UNITED STATES PATENT OFFICE.

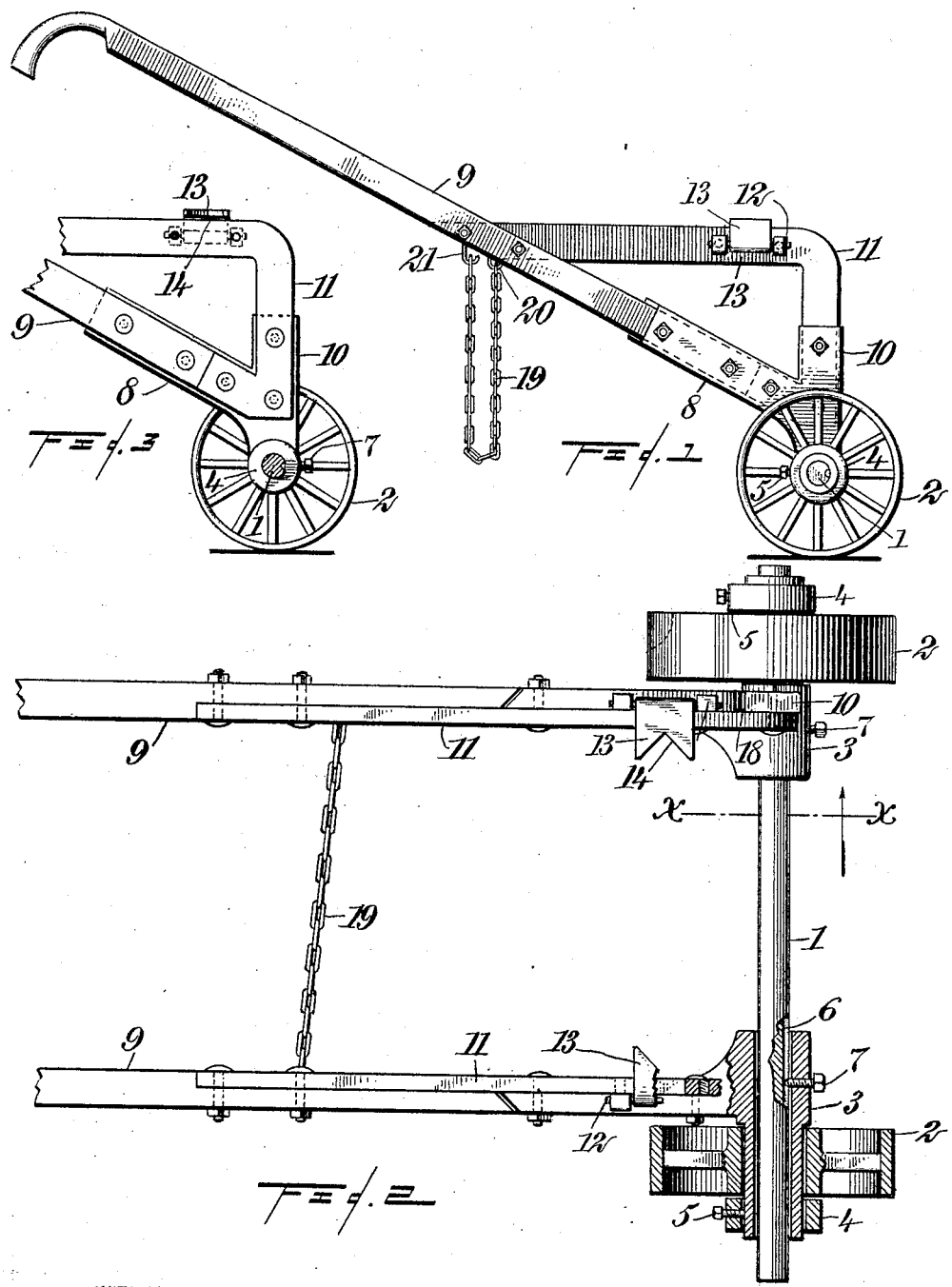

WILLIAM HAROLD ARMSTRONG, OF VANWERT, OHIO.

TRUCK.

No. 796,792. Specification of Letters Patent. Patented Aug. 8, 1905.

Application filed March 24, 1905. Serial No. 251,839.

*To all whom it may concern:*

Be it known that I, WILLIAM HAROLD ARMSTRONG, a citizen of the United States, and a resident of Vanwert, in the county of Van Wert and State of Ohio, have invented a new and Improved Truck, of which the following is a full, clear, and exact description.

This invention relates to improvements in hand-trucks particularly adapted for carrying heating-radiators, the object being to provide a truck that may be readily adjusted to different sizes of radiators and having means for firmly gripping a radiator so as to prevent any movement thereof relative to the truck.

I will describe a truck embodying my invention and then point out the novel features in the appended claims.

Reference is to be had to the accompanying drawings, forming a part of this specification, in which similar characters of reference indicate corresponding parts in all the figures.

Figure 1 is a side elevation of a truck embodying my invention. Fig. 2 is a plan thereof, partly in section; and Fig. 3 is a section on the line $x$ $x$ of Fig. 2.

The truck comprises an axle 1, longitudinally of which the supporting-wheels 2 are adjustable. As here shown, these wheels have their bearings on sleeve 3 and are held in position on said sleeves by means of rings 4, held by set-screws 5. The axle 1 is provided with a longitudinal channel 6 for receiving the set-bolts 7, which engage in tapped holes in the sleeves and pass into said channel. Each sleeve has extended upwardly and rearwardly from it a socket member 8 for receiving a handle-bar 9, of wood or other suitable material, and each sleeve also has an upwardly-extended member 10 for receiving the vertical portion of a gripper-plate carrying-bar 11, the horizontally-disposed portion of which is bolted to the handle-bar. Each bar 11 is provided with a bolt 12, on which a gripper-plate 13 swings. The gripper-plates have V-shaped notches 14 for receiving portions of the radiator.

A chain 19 is attached, by means of an eye 20, to one of the handle-bars and is designed to engage one of its links with a hook 21 on the other handle-bar. This chain is designed to be used for carrying small radiators—such, for instance, as a radiator of about eighteen inches in height.

In the operation one end of the radiator to be transported is to be lifted and the truck passed underneath the same to about its center, and then the gripping-plates are moved into position to engage with the radiator, which, it will be understood, is arranged lengthwise of the truck.

A truck embodying my invention will be found very useful in carrying radiators or the like over a hardwood or finished floor without danger of marring or scratching the floor and can be operated by one man after the radiator is on the truck.

Having thus described my invention, I claim as new and desire to secure by Letters Patent—

1. A hand-truck comprising an axle, wheels adjustable lengthwise of the axle, handle-bars extended from the axle, bars extended from the axle to connection with the handle-bars, and gripping-plates mounted to swing on said last-named bars.

2. A hand-truck comprising an axle, sleeves adjustable lengthwise on the axle, wheels having their bearings on said sleeves, handle-bars extended from the sleeves, gripper-plate-supporting bars having vertical portions extended from the sleeves and also having horizontal portions connecting with the handle-bars, and gripping-plates mounted to swing on said last-named bars and having V-shaped notches.

3. A truck comprising an axle having a longitudinal channel, sleeves movable along said axle, set-screws engaging with said sleeves and adapted to pass into said channel, handle-bars extended from the sleeves, gripper-bars having connection with the sleeves, and also with the handle-bars, and plates mounted to swing on the bars and having V-shaped notches.

4. A truck comprising an axle, sleeves adjustable lengthwise of said axle, means for holding the sleeves as adjusted, wheels having their bearings on said sleeves, handle-bars extending from the sleeves, a chain connecting the handle-bars, gripper-supporting bars having connection with said sleeves and also with the handle-bars, bolts on said bars, and plates having pivotal connection with said bolts, the said plates having V-shaped notches.

5. A hand-truck comprising an axle, sleeves adjustable along said axle, means for locking the sleeves as adjusted, wheels having their bearings on said sleeves, rings detachably engaging the sleeves and engaging with the outer ends of the wheel-hubs, handle-bars extended from the sleeves, gripper-supporting bars having connection with the handle-bars and with said sleeves, the said gripper-supporting bars having horizontal portions, and gripping-plates arranged to swing on the bars.

In testimony whereof I have signed my name to this specification in the presence of two subscribing witnesses.

WILLIAM HAROLD ARMSTRONG.

Witnesses:
 Mrs. W. H. ARMSTRONG,
 Mrs. H. E. ELLIOTT.